(12) United States Patent
Araki

(10) Patent No.: US 6,924,951 B2
(45) Date of Patent: Aug. 2, 2005

(54) MAGNETIC TRANSFER APPARATUS

(75) Inventor: Minoru Araki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/794,064

(22) Filed: Mar. 8, 2004

(65) Prior Publication Data
US 2004/0240094 A1 Dec. 2, 2004

(30) Foreign Application Priority Data
Mar. 7, 2003 (JP) .................................. P. 2003-061747

(51) Int. Cl.⁷ .............................................. G11B 5/86
(52) U.S. Cl. ...................................................... 360/17
(58) Field of Search .............................. 360/17, 16, 15

(56) References Cited

U.S. PATENT DOCUMENTS 5,121,258 A * 6/1992 Chi et al. ..................... 360/17

2004/0040668 A1 * 3/2004 Kamatani .................... 156/540

FOREIGN PATENT DOCUMENTS

JP 11-25455 A 1/1999

* cited by examiner

Primary Examiner—Alan T. Faber
(74) Attorney, Agent, or Firm—Sughrue Mion, PLLC

(57) ABSTRACT

A magnetic transfer apparatus for transferring patterned information formed on a surface of a master disk to a magnetic recording medium as a slave disk placed in intimate contact with the surface of the master disk by applying a magnetic field to the disks, which comprises: a magnet; a first holder for holding the master disk and the slave disk; and a second holder facing the first holder, the first holder being supported by a supporting member, the magnet being disposed on only an outer side of the second holder, and the second holder being formed solely of a lid.

5 Claims, 5 Drawing Sheets

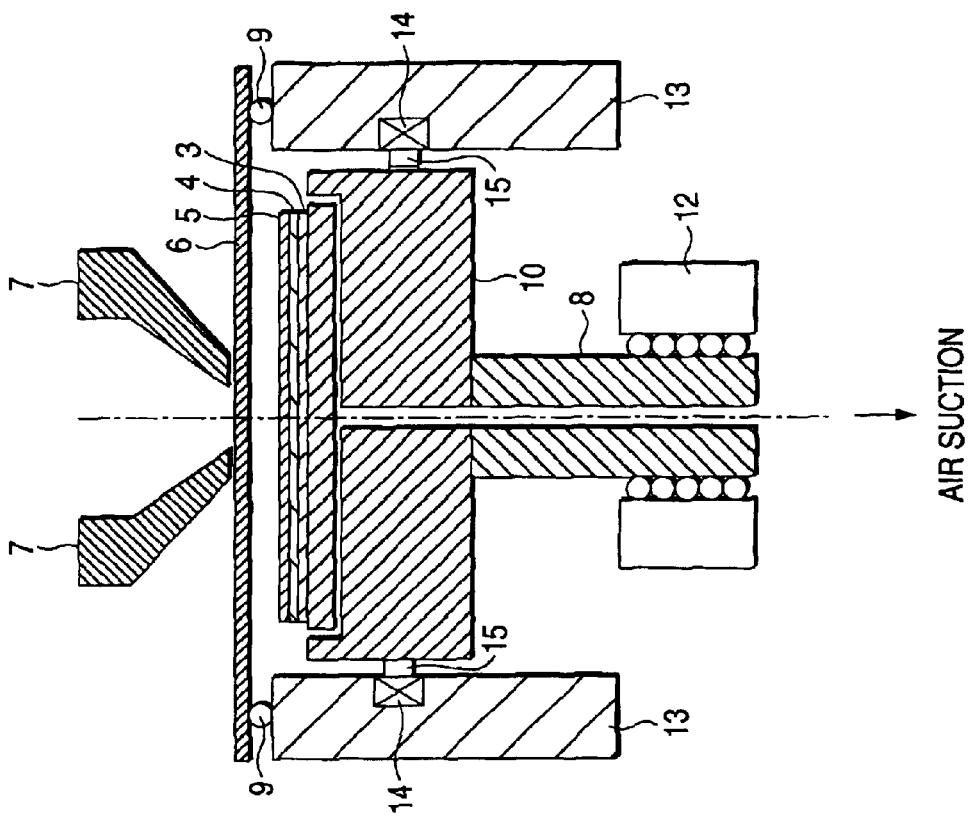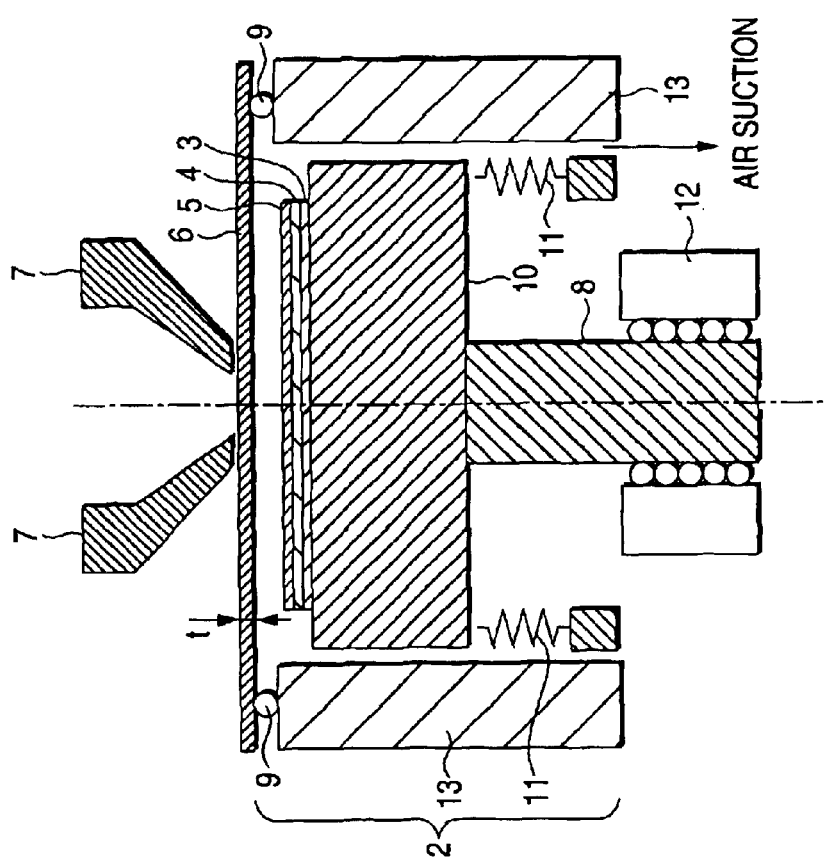

MAGNETIC TRANSFER APPARATUS

FIELD OF THE INVENTION

This invention relates to a magnetic transfer apparatus for transferring patterned information formed on a master disk to a magnetic recording medium as a slave disk.

BACKGROUND OF THE INVENTION

Magnetic transfer is a technique for transferring information, such as survo information, from a master medium to the magnetic recording layer of a magnetic recording medium (hereinafter referred to as a slave medium or a slave disk) placed in close contact with the master medium by applying a magnetic field to the disks. The master medium carries thereon a pattern of fine unevenness formed of a magnetic substance in accordance with information to be transferred such as survo signals. A known apparatus for carrying out magnetic transfer is disclosed in JP-A-11-25455.

FIG. 4 is a cross-sectional view of the magnetic transfer device of JP-A-11-25455. A vacuum pump 17 is operated with a valve 18 open to evacuate grooves 14 formed on a master disk 25. As a result, a slave disk 21 is brought into intimate contact with the patterned area of the master disk 25 by the atmospheric pressure 23. A magnetic field for magnetic transfer is applied to the disks in that state.

FIG. 5 is another known magnetic transfer apparatus featuring ensured vacuum contact. The apparatus has a pair of disk holders 35 and 36 each having suction holes 35b and 39b, respectively. A master disk 33 is fixed on the holder 35 by suction from a vacuum pump through an evacuation pipe 34 and the suction holes 35b. A slave disk 37 is superposed on the master disk 33 and fixed at the right position by suction through a pipe 38. Another master disk 39 is fixed on the other holder 39 by suction through an evacuation pipe 40 and the suction holes 39b. The holders 35 and 36 are joined together via an annular sealing member 42 to form a closed space therebetween. An elastic member 43 is provided as a buffer so as to allow the holders 35 and 36 to move in their axial direction by the amount of deformation. An O-ring 45 is seated on the sealing member 42 to seal the closed space. A slide sealing O-ring 44 is also seated on the sealing member 42 to seal the closed space.

According to JP-A-11-25455, however, a sufficient contact pressure is not obtained because of the absence of a holder for holding the master disk 25. The apparatus shown in FIG. 5 has difficulty in reducing the thickness of the holders 35 and 36. Besides, in the apparatus of FIG. 5, a magnet cannot approach the center of rotation because of the shafts 41 at the center of rotation.

SUMMARY OF THE INVENTION

An object of the present invention is to provide a magnetic transfer apparatus which allows a magnet to be brought closer to the magnetic transfer surface and the center of rotation, makes it possible to apply a sufficient contact pressure between a master disk and a slave disk without deforming the master disk, has such a structural configuration that gives broader freedom of design, and contains no sliding part inside the space for holding disks so as to prevent dropouts ascribed to dusting.

The object of the invention is accomplished by a magnetic transfer apparatus for transferring patterned information formed on a surface of a master disk to a magnetic recording medium as a slave disk placed in intimate contact with the surface of the master disk by applying a magnetic field to the disks, which comprises: a magnet; a first holder for holding the master disk and the slave disk; and a second holder facing the first holder, the first holder being supported by a supporting member, the magnet being disposed on only an outer side of the second holder, and the second holder being formed solely of a lid. In contrast to a conventional apparatus having a magnet on both sides of a slave disk, because a magnet is disposed on only one side of the apparatus, i.e., by the side of the lid having no shaft, it is possible to bring the magnet close to the center of rotation. By this configuration, a magnetic field can be applied to the disks uniformly.

In a preferred embodiment of the apparatus, the first and the second holders are asymmetric about the magnetic transfer surface, and an operative mechanism such as a supporting and rotating shaft for the first holder, a motor for rotating the shaft, a suction pump, etc. are disposed on the side of the first holder. According to this embodiment, since the apparatus has the shaft on only one side thereof with the lid on the other side, a magnet can be placed on a whole area of the lid side, and the operative mechanism can be concentrated in one side of the apparatus, which eliminates spatial constraint.

The first holder preferably contains a disk-shaped table for supporting the master disk and the slave disk, a cylindrical lid supporting member and a sliding mechanism, and the sliding member is isolated from the disks by disposing a buffer seal member between the table and the lid supporting member. In this embodiment, the disks are protected against adhesion of dust generated from the sliding mechanism when the sliding mechanism operates to position the holder thereby forming a closed space between the lid and the holder and fixing the slave disk between a pair of master disks in the closed space.

The second holder comprising the lid preferably has a thickness of 0.5 to 7 mm, which results in uniform contact pressure between the slave disk and the master disks. Furthermore, the magnets can come sufficiently close to the stack of disks, and a sufficient magnetic intensity can be obtained.

The second holder is preferably thicker in the peripheral portion than the central portion thereof. In this embodiment, non-uniformity of contact pressure due to deformation of the lid can be prevented, and it is possible to reduce the thickness of the lid, which allows the magnet to come closer.

BRIEF DESCRIPTION OF THE DRAWINGS

FIGS. 2A and 2B each show the sliding mechanism of the supporting table used in the magnetic transfer apparatus of FIG. 1.

DETAILED DESCRIPTION OF THE INVENTION

The present invention will further be illustrated with respect to its preferred embodiments by way of the drawings.

Figure 1:
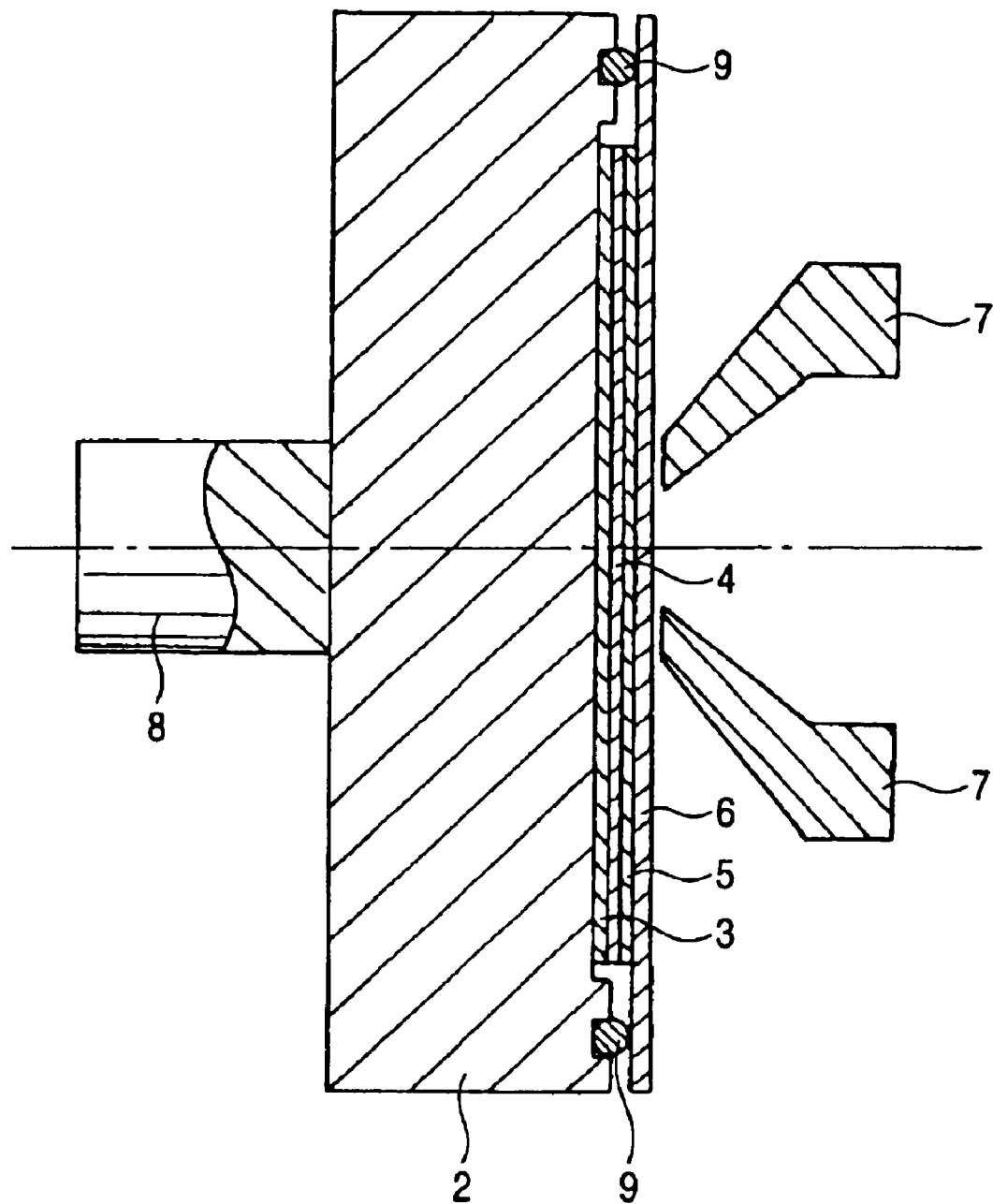
FIG. 1 is a cross-section of a magnetic transfer apparatus according to the present invention.

FIG. 1 is a cross-sectional view of a magnetic transfer apparatus according to one embodiment of the invention. The magnetic transfer apparatus shown in FIG. 1 has a first holder 2 for holding a pair of master disks 3, 5 and a slave disk 4 sandwiched between the pair of master disks 3, 5 by a suction mechanism (not shown), a plate-shaped lid 6 facing the first holder 2 as a second holder to form a closed space together with the holder 2, a pair of magnet (a head for magnetic field application) 7, 7 disposed by the side of the lid 6, a shaft 8 for supporting and rotating the holders during magnetic transfer, and an O-ring 9 for fixing the first holder 2 and the second holder 6 and shielding the closed space. In the closed space, a first master disk 3 is held to the first holder 2, a slave disk 4 is brought into intimate contact with the first master disk 3 in the right position, and a second master disk 5 is brought into intimate contact with the slave disk 4. The shaft 8 contains therein a suction pipe, etc.

Figure 5:
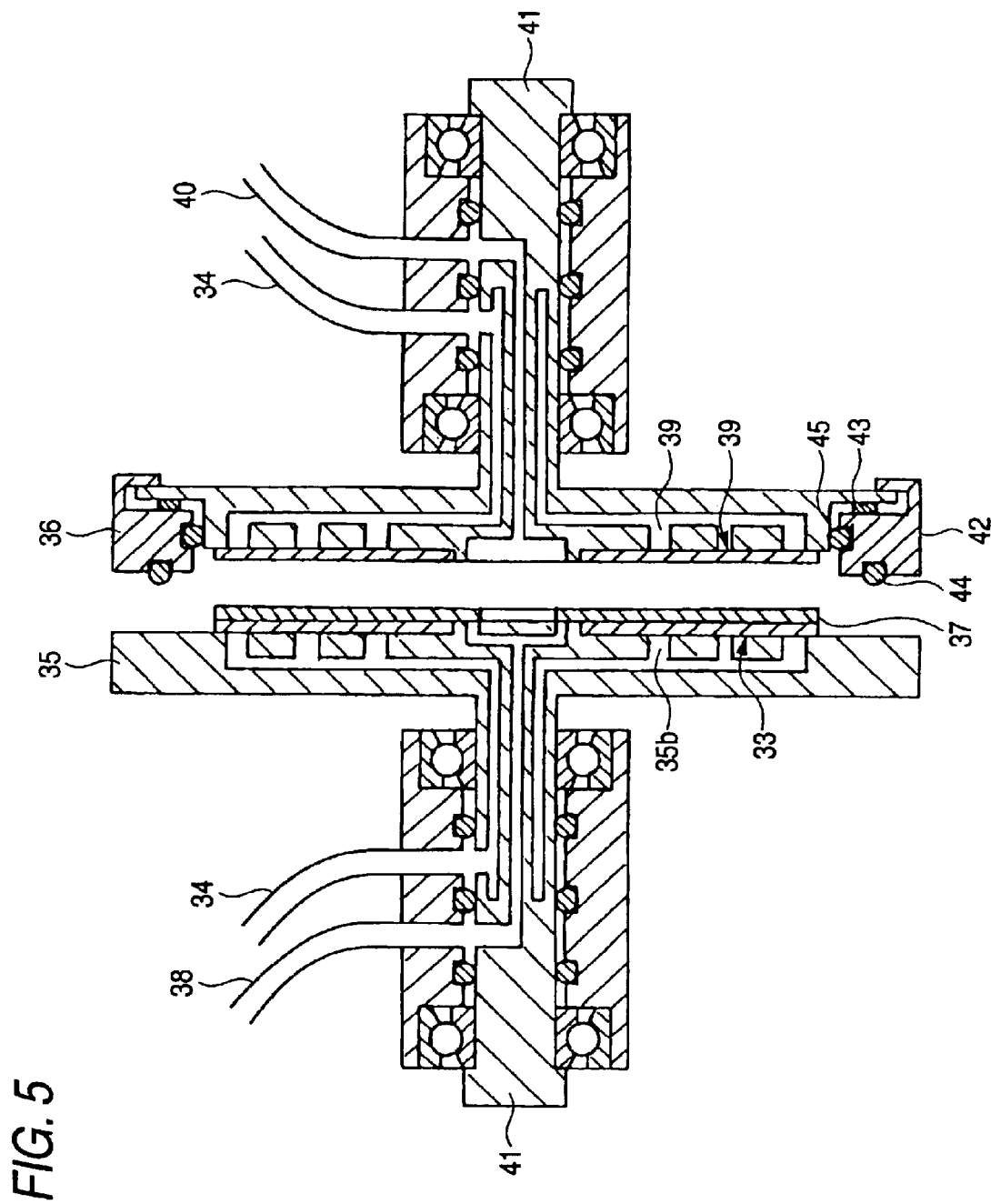
FIG. 5 is a cross-section of a conventional master holder.

The magnetic transfer apparatus shown in FIG. 1 is structurally similar to the conventional apparatus shown in FIG. 5, except that the right-hand side holder 36 of FIG. 5 is replaced with the lid 6. Positioning of the slave disk 4 and the master disks 3 and 5 on the first holder 2 is carried out in a known manner using, for example, optical equipment as described in JP-A-11-175973. Procedures after positioning are, for example, as follows. The first master disk 3 is fixed on the first holder 2 by suction through a suction mechanism (not shown). The slave disk 4 is fixed thereon by suction. The second master disk 5 is then fixed on the slave disk 4 by suction to sandwich the slave disk 4 in between the master disks 3 and 5. The second holder 6 is fixed to the first holder 2 via the O-ring 9 thereby to form a closed space and hold the stack of the disks. By this structure, deformation of the master disks can be averted completely.

The first and second holders are rotated by the shaft 8, and the information recorded on the two master disks 3 and 5 are transferred to the both surfaces of the slave disk 4 respectively, by applying a magnetic field of the pair of magnets 7, 7 such as permanent magnets and electromagnets placed by the side of the second holder 6. It is possible to rotate the magnets 7, 7 instead of rotating the holder.

According to this embodiment, since there is no obstructive member (such as a shaft) on the outer side of the lid 6, the magnet 7 is allowed to come close to the magnetic transfer surface and the center of rotation. Therefore, a magnetic field can be applied uniformly to the whole area of the slave disk. Since the magnets 7, 7 is disposed on the lid side of the apparatus while the other parts including the shaft are disposed on the other side, an extra space is afforded to increase the freedom of designing the apparatus.

The apparatus of the present embodiment preferably has no sliding mechanism like the sealing member 42 adopted in the conventional apparatus shown in FIG. 5 in which the O-rings 44 and 45 slide via the elastic member 43. As a result, the apparatus is free from the dusting problem that a sliding mechanism generates dust which can adhere to the master and the slave disks to cause dropouts.

FIG. 2 is a schematic cross-section of an another embodiment of first and second holders. A buffer seal member used in FIGS. 2A and 2B is a bellows type and a magnetic fluid/permanent magnet type, respectively.

In FIG. 2A, bellows 11, 11 are provided between the outer periphery of a rotatable table 10 for supporting disks and the inner periphery of a cylindrical lid supporting member 13 to block air passage between the closed space and open air.

In FIG. 2B, a flexible container containing a magnetic fluid 15 is provided on the outer peripheral surface of the rotatable table 10 over the whole circumference, and permanent magnets 14 are discretely provided on the inner peripheral surface of the lid supporting member 13 over the whole inner circumference. With all the members are in position for magnetic transfer, the magnetic fluid 15 and the permanent magnet 14 attract each other to block air passage between the closed space and open air. The magnetic fluid and the permanent magnets are interchangeable. That is, the permanent magnet 14 may be provided on the lid supporting member 13, while the flexible container containing the magnetic fluid 14 may be provided on the rotatable table 10.

Both the apparatus shown in FIGS. 2A and 2B are of the type in which the rotatable table 10 is slid toward the lid 6 by a sliding mechanism 12 so that the master disks 3 and 5 and the slave disk 4 may be brought into intimate contact with each other. The lid 6 is attached to the lid supporting member 13 via the O-ring 9. The first master disk 3 is positioned above the rotatable table 10 and fixed to the table 10 by means of a suction mechanism (not shown). The slave disk 4 is fixed on the master disk 3 by suction. The second master disk 5 is fixed on the slave disk 4 by suction thereby to sandwich the slave disk 4 between the two master disks 3 and 5. The table 10 is slid toward the lid 6 while sucking up the air between the second master disk 5 and the lid 6. As a result, all the disks and the lid 6 are brought into intimate contact. In this state, magnetic transfer is conducted while rotating these members all together relatively to the magnets 7, 7.

This structure involves no rotational friction of the members such as the O-ring and therefore generates no dust. Further, the stack of the disks is confined in the closed space formed by the lid 6, the first holder 2, the O-ring 9, and the bellows 11 (FIG. 2A) or the permanent magnet/magnetic fluid (FIG. 2B) and therefore allows no dust to enter. The structure completely prevents such troubles as deformation of the master disk.

Master-holding members used in conventional magnetic transfer apparatus for achieving ensured contact between a slave disk and a master disk include (1) the holder 36 shown in FIG. 5 and (2) a holder having a buffer such as urethane foam disposed on its surface on which a master disk is to be held. The holder 36 has the sealing member 42 provided with the elastic member 43 that works as a buffer on sliding. The design of FIG. 5 cannot get rid of the dusting problem caused by the O-ring's sliding. The holder having a buffer of urethane foam, etc. also causes dusting from the buffer in direct contact with a master disk. In contrast, the buffer used in the present embodiment is the bellows 11 or the combination of the permanent magnet 14 and the magnetic fluid 15. As a result, dusting from the buffering mechanism can be suppressed, and the possible dusting problem is greatly reduced.

The lid 6 used in the embodiment of FIG. 1 has a disk plate shape. The lid portion of the holder facing the magnet 7 preferably has a thickness of 0.5 to 7 mm.

Figures 3A, 3B:
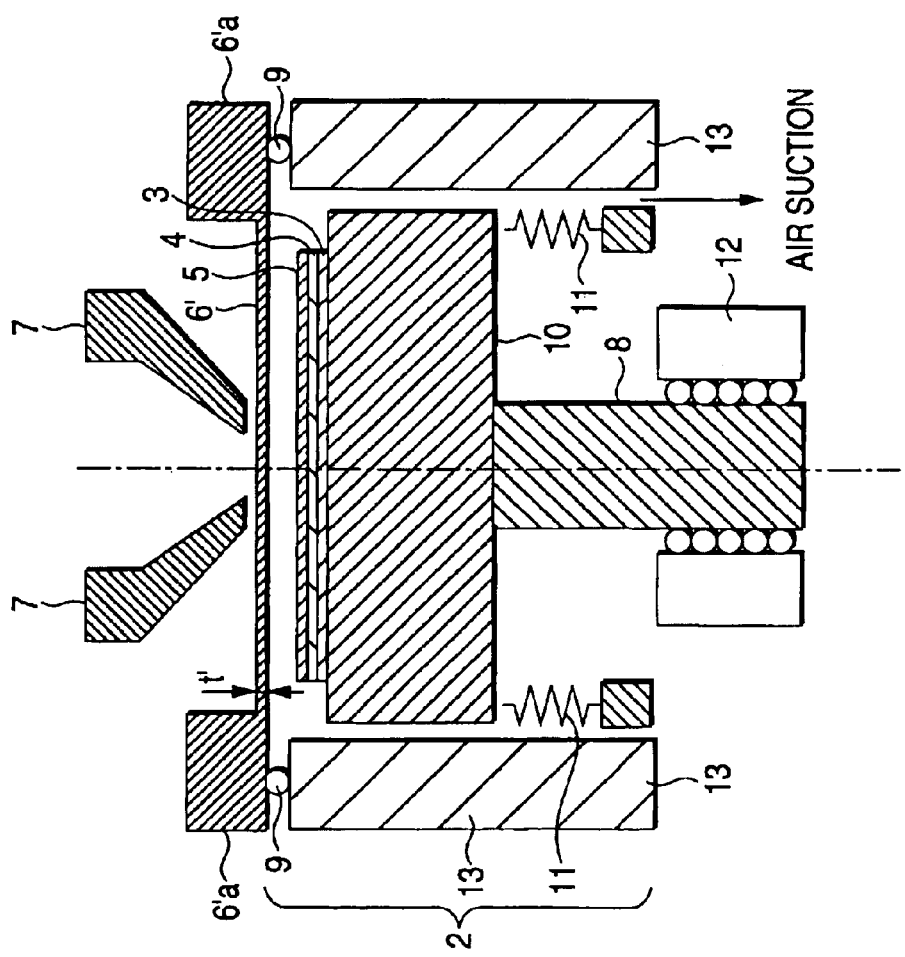
FIG. 3 (FIGS. 3A and 3B) shows a modification of the lid shown in FIG. 1.
Figure 4:
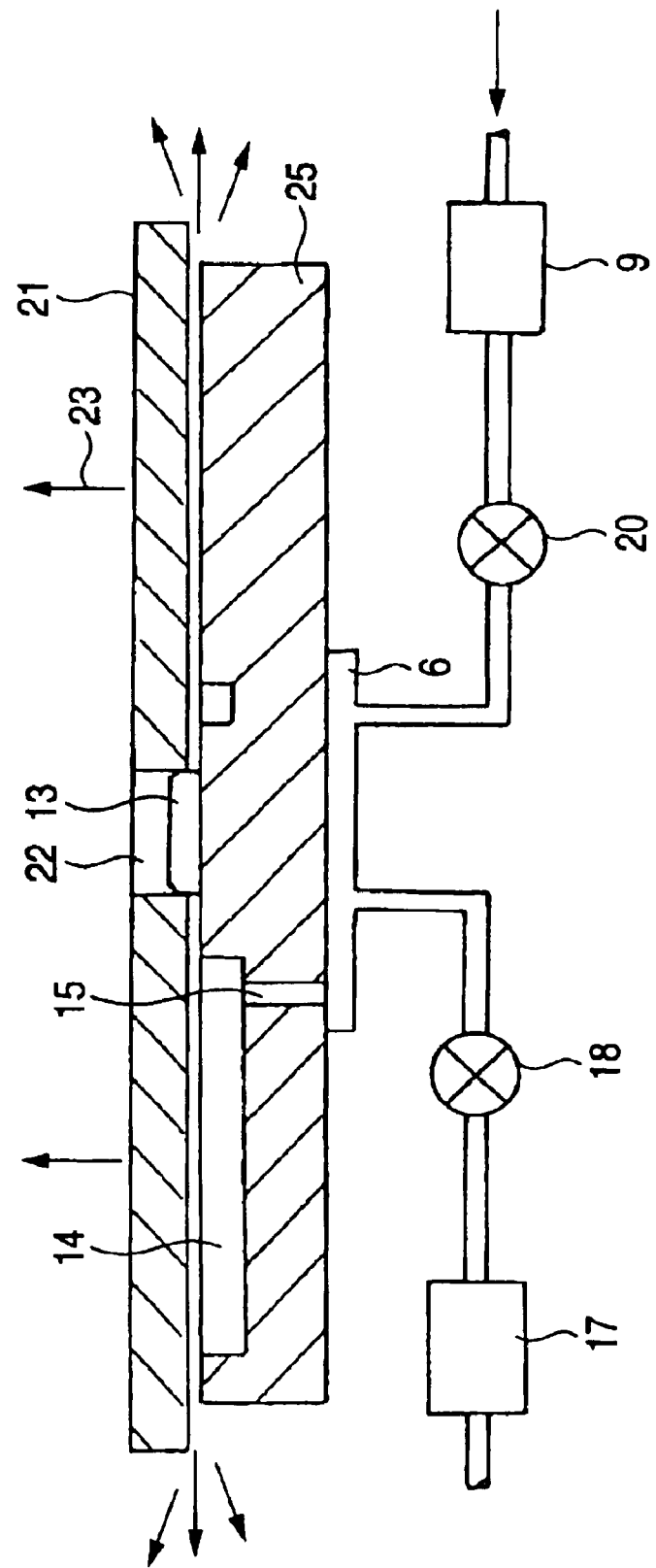
FIG. 4 is a cross-section of a conventional magnetic transfer apparatus.

It is still preferred that the lid has a raised annular edge as shown in FIG. 3. FIG. 3A is a schematic cross-section of the table 10 and its vicinities including the lid. FIG. 3B is a perspective of the lid. The lid 6' shown in FIG. 3A is different from the lid 6 of FIG. 2A in two points. The first difference is that the lid 6' has a thick periphery 6'a. The second one is that the thickness t' of the part of the lid 6' near the magnet is smaller than the thickness t of the lid 6 near the magnet.

With such a raised periphery, uniformity of contact pressure between the master disks and the slave disk can be performed, which enables reduction of the thickness of the central area of the lid. It follows that the magnet 7 is allowed to come closer to the stack of disks.

As having been described, the invention provides a magnetic transfer apparatus for transferring information patternwise recorded on the recording surface of a master disk to a slave disk placed in intimate contact with the recording surface of the master disk by applying a magnetic field to the disks, in which a magnet for magnetic transfer is disposed on only one side of the apparatus, and the holder on the magnet side is formed solely of a lid. This structural configuration allows the magnet to come close to the magnetic transfer surface and the center of rotation. As a result, magnetic transfer to the entire area of a slave disk can be achieved uniformly and highly reliably to provide the slave disk with high quality magnetic signals with no dropouts.

Since the holders are asymmetric about the magnetic transfer surface such that the structure and the shaft for supporting and rotating the holder are disposed opposite to the magnet, a sufficient contact pressure can be applied to the master/slave disks without causing the master disk to be deformed. Since the mechanical part of the apparatus can be placed opposite to the magnet, the apparatus can be designed with little spatial restriction.

Since the table for supporting the master/slave disks has a sliding mechanism, and the sliding member is isolated from the master/slave disks by bellows, there is no sliding part in the closed space between holders. As a result, the dusting problem can be prevented.

What is claimed is:

1. A magnetic transfer apparatus for transferring patterned information on a surface of a master disk to a magnetic recording medium as a slave disk placed in intimate contact with the surface of the master disk by applying a magnetic field to the disks, which comprises: a magnet; a first holder for holding the master disk and the slave disk; and a second holder facing the first holder, the first holder being supported by a supporting member, the magnet being disposed on only an outer side of the second holder, and the second holder being formed solely of a lid.

2. The magnetic transfer apparatus according to claim 1, wherein the first and the second holders are asymmetric about the magnetic transfer surface, and an operative mechanism is disposed on an outer side of the first holder.

3. The magnetic transfer apparatus according to claim 1, wherein the first holder comprises a disk-shaped table for supporting the master disk and the slave disk, a cylindrical lid supporting member and a sliding mechanism, the sliding mechanism being isolated from the master disk and the slave disk by a buffer seal member positioned between an outer peripheral surface of the disk-shaped table and an inner surface of the cylindrical lid supporting member.

4. The magnetic transfer apparatus according to claim 1, wherein the second holder has a thickness of 0.5 to 7 mm in at least the portion facing the first holder.

5. The magnetic transfer apparatus according to claim 1, wherein the second holder is thicker in a peripheral portion thereof than the portion facing the master and slave disks.

* * * * *